United States Patent [19]

Bravenec

[11] 4,451,790
[45] May 29, 1984

[54] SPONTANEOUS POTENTIAL LOG APPARATUS WITH RANDOMLY OCCURRING NOISE CANCELLATION

[75] Inventor: Frank R. Bravenec, Houston, Tex.
[73] Assignee: Halliburton Company, Duncan, Okla.
[21] Appl. No.: 319,842
[22] Filed: Nov. 10, 1981
[51] Int. Cl.³ .......................... G01V 3/26; G01V 3/34
[52] U.S. Cl. .................................... 324/351; 328/165; 340/858
[58] Field of Search .............. 324/323, 331, 334, 338, 324/339, 346, 351, 355, 366, 140 R; 328/165; 340/856-860

[56] References Cited

U.S. PATENT DOCUMENTS

| 2,436,503 | 2/1948 | Cleveland | 324/323 X |
| 3,172,036 | 2/1965 | Waters | 324/323 |
| 3,263,159 | 7/1966 | Albright | 324/323 |
| 3,277,440 | 10/1966 | Gouilloud et al. | 324/323 X |
| 3,406,359 | 10/1968 | Welz et al. | 324/323 |
| 3,490,032 | 1/1970 | Zurflueh | 324/331 X |
| 3,493,849 | 2/1970 | Doll | 324/339 X |

*Primary Examiner*—Gerard R. Strecker
*Attorney, Agent, or Firm*—W. J. Beard

[57] ABSTRACT

In the disclosed and illustrated embodiment, an improved method and apparatus for obtaining an improved spontaneous potential log is set forth. On a single sonde, multiple spontaneous potential electrodes, aligned vertically along the length of the sonde at spaced location, are positioned to transverse a well bore as the sonde is pulled from the well to obtain a measure of spontaneous potential from each electrode. The apparatus and method further discloses means multiplexing the signals from the several spontaneous potential electrodes whereupon the signals are converted by an analog to digital converter into digital words. By synchronizing with the multiplexing, a digital word is obtained for each electrode at a time such that such electrode is read at a common elevation. The several digital words are then input to delay lines, there being one delay line for each electrode, wherein the delay occurs in multiples of T where T equals the time delay between electrodes. The data is thus time shifted (equal to well depth shifting) so that the spontaneous potential measured at a particular elevation for each electrode is synchronized to thereby permit addition of all the data. Randomly occurring noise is reduced in magnitude. Signals of interest are enhanced compared to the noise.

10 Claims, 4 Drawing Figures

SPONTANEOUS POTENTIAL LOG APPARATUS WITH RANDOMLY OCCURRING NOISE CANCELLATION

BACKGROUND OF THE DISCLOSURE

The disclosure set forth hereinbelow relates to a well logging method and apparatus for use with spontaneous potentials measured in various earth formations along the length of a well bore. The term spontaneous potential refers to the potential difference which exists naturally as a result of electrochemical differences between a pair of contacts. One contact is the reference electrode which is typically located at the surface near a well. It normally has the form of a metal grounding plate which is usually dropped in the mud pit, a good ground reference. It is the reference or ground electrode. A cooperative spontaneous potential electrode is normally carried on a sonde which is lowered and raised in a well bore on a cable. The sonde supports a spontaneous potential electrode which electrically contacts the well bore fluid which contacts the various formations penetrated by the well bore. As done heretofore, a typical SP (referring to spontaneous potential) logging method has normally utilized a sonde which is raised and lowered on a line and the potential difference between the two electrodes is measured. This normally occurs as the SP electrode is pulled up the well bore on the sonde past the various formations penetrated by the well bore.

SP logs obtained in the past have been susceptible to variations as a result of a number of factors. Ordinarily, the SP log which is obtained from a well is in the millivolt range. Because the potential is relatively low, it is susceptible to noise. Many sources of noise exist. There is always static or background noise which might be termed white noise. Other noise factors exist such as the buildup of a static charge in the earth preliminary to an electrical storm. The use of electrical equipment in the nearby area creates noise. For instance, electric arc welders are noisy devices. Many drilling rigs use electric generators which generate currents in the range of 1,000 amperes or more and, hence, they are usually sources of noise. Whatever the source, noise is a problem in the near vicinity of the equipment, and the noise is presumed to occur in a random fashion of sufficient magnitude to obscure the data, particularly in light of the millivolt size of the SP data.

By definition, noise is a random phenomena. Even where the noise is coherent as in the instance of sixty cycle hum, it nevertheless does obscure the SP data. The SP log is, thus, burdened with a significant amount of noise. The noise can come from any number of sources including those described above and can otherwise be detected in the equipment. It is difficult to arrange an apparatus for obtaining a millivolt signal from a depth of 10,000 feet or greater which signal is to be ultimately recorded on a strip chart or film recorder in mobile equipment at the drilling site.

There are unlimited variables which cannot be fully controlled. These variables relate to the electrical grounding of the surface electrode, as an example, and may also relate to stray voltage pickup by the equipment. Without extending the list indefinitely, it will be observed that obtaining and recording a millivolt signal is difficult in the best of circumstances. In light of the environment in which most SP logs must be recorded, the difficulty is all the greater.

It has been discovered that an SP log can be materially enhanced through the use of the present invention. The present invention contemplates the construction of a sonde which is to be lowered into a well on a wireline and retrieved from the well. It is normally run in open hole so the electrodes can contact the mud and adjacent formation to obtain the SP log. The measurement of SP occurs continuously as the sonde is pulled from the well bore toward the surface or as the sonde is lowered into the well.

This invention takes advantage of noise reduction capabilities in summing noise (an incoherent signal) mixed with coherent signals. The coherency of the signals is observed by addition or stacking accomplished by selected delay lines. Moreover, the sonde is equipped with multiple electrodes, each of which is capable of obtaining a specific SP. The electrodes are spaced vertically along the sonde. They are spaced at a fixed or known distance from one another. Assume, for easy description, that they are spaced one foot apart. Assume further that the sonde is pulled from the well at the rate of one foot per second. The spontaneous potential SP measured by a given electrode at the top of the sonde, at a given formation, will be subsequently observed by the next lower SP electrode which moves past that depth level one second later. The present invention contemplates the use of several SP electrodes so that several signals are obtained. They differ from one another in shifting of the time or depth base line. Thus, if eight electrodes are installed on a given sonde and they are spaced in the manner described and the tool is retrieved from the well bore at the rate suggested, then the eight electrodes will measure the spontaneous potential SP of a given formation eight different times. The eight signals obtained from the eight electrodes are then time or depth shifted and summed, the summing being an additive step whereby reduction of noise is obtained.

This improved system yields a superior SP log. The several SP electrodes are supported on a common or a single sonde and are operated simultaneously to obtain several individual SP logs prior to addition.

The method contemplated in this disclosure includes the steps of obtaining multiple SP logs from a single pass of a SP supporting sonde in a well bore. The several SP electrodes form individual signals. The individual signals are recorded on a common time or depth base line. One signal is chosen as a reference and the other signals are time or depth shifted. The shift moves the various signals so that they coincide whereby the signal obtained from a given electrode, at a given formation, is coincident with the signals from other SP electrodes adjacent to that same formation. Recalling that all signals have noise superimposed on them in an incoherent fashion, the additive step obtains an output in which the coherent signals reinforce additively and the incoherent noise components tend to cancel and are thereby reduced compared to the coherent component.

The present apparatus has the advantage that signal handling is markedly improved. While difficult and expensive equipment can be incorporated to protect millivolt signals which are normally encountered in SP logging, this apparatus is able to provide a signal which is significantly larger than the typical millivolt range signal. Moreover, at the step where signal addition does occur, the output signal is significantly larger and is, therefore, far less susceptible to obscuration by noise. Data interpretation is thereby enhanced.

An alternate feature is synchronizing the system clock with the depth of the sonde yielding a sampling rate providing uniformly spaced data along the well bore. Further, each SP measurement at a corresponding depth trace can be individually compared against the other SP measurements at the same depth or used to establish a statistical base.

With the foregoing in view, the present system is summarized as a multiple electrode sonde having a number of SP electrodes arranged at spaced locations along the length thereof to obtain multiple SP logs during a single pass. The several logs are then time shifted in delay lines, the preferred form being a digital delay line whereby one of the SP signals is chosen as a reference and all the other signals are time or depth shifted to coincide with the reference signal. The degree of shift in the various delay lines brings the several signals into depth coincidence whereby subsequent addition or stacking nulls the noise while providing an enhanced output signal of the coherent component of the signal.

BRIEF DESCRIPTION OF THE DRAWINGS

So that the manner in which the above recited features, advantages and objects of the invention, as well as others, which will become apparent, are attained and can be understood in detail, a more particular description of the invention, briefly summarized above, may be had by reference to the embodiments thereof illustrated in the appended drawings, which drawings form a part of this specification. It is to be noted, however, that the appended drawings illustrate only typical embodiments of the invention and are not to be considered limiting of its scope, for the invention may admit to other equally effective embodiments.

DETAILED DESCRIPTION OF THE PREFERRED EMBODIMENT

Figure 1:
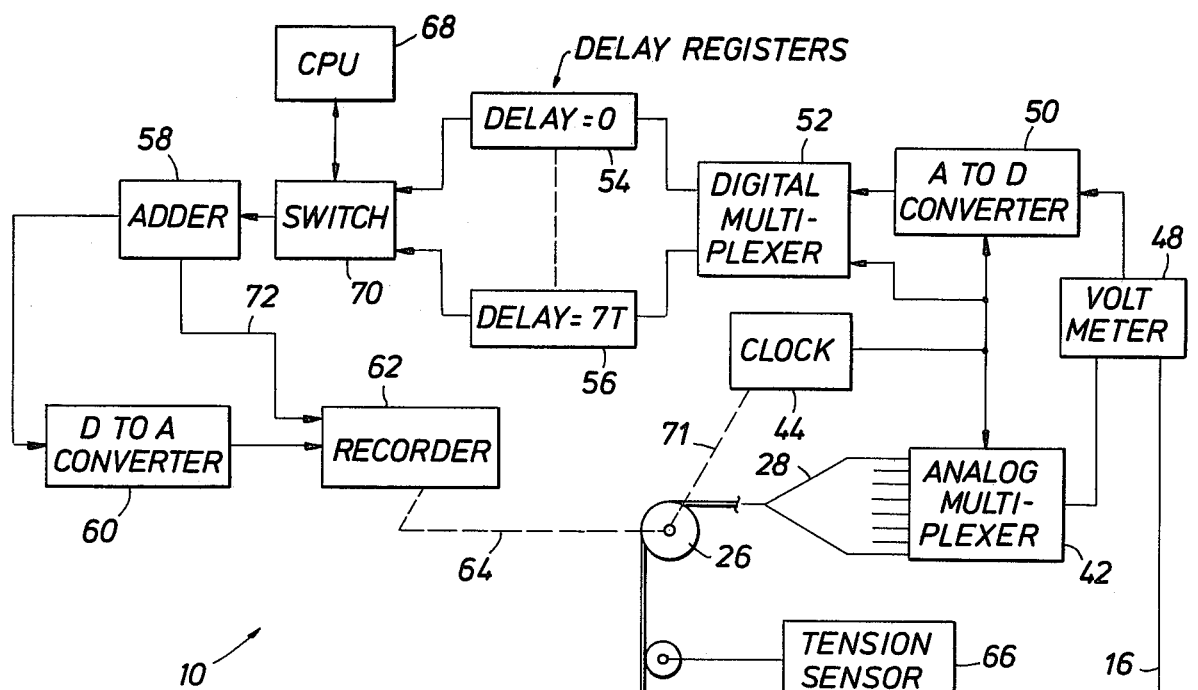
FIG. 1 is a schematic block diagram of the improved SP logging system of this disclosure shown in a well bore for obtaining an SP log.
Figure 1:
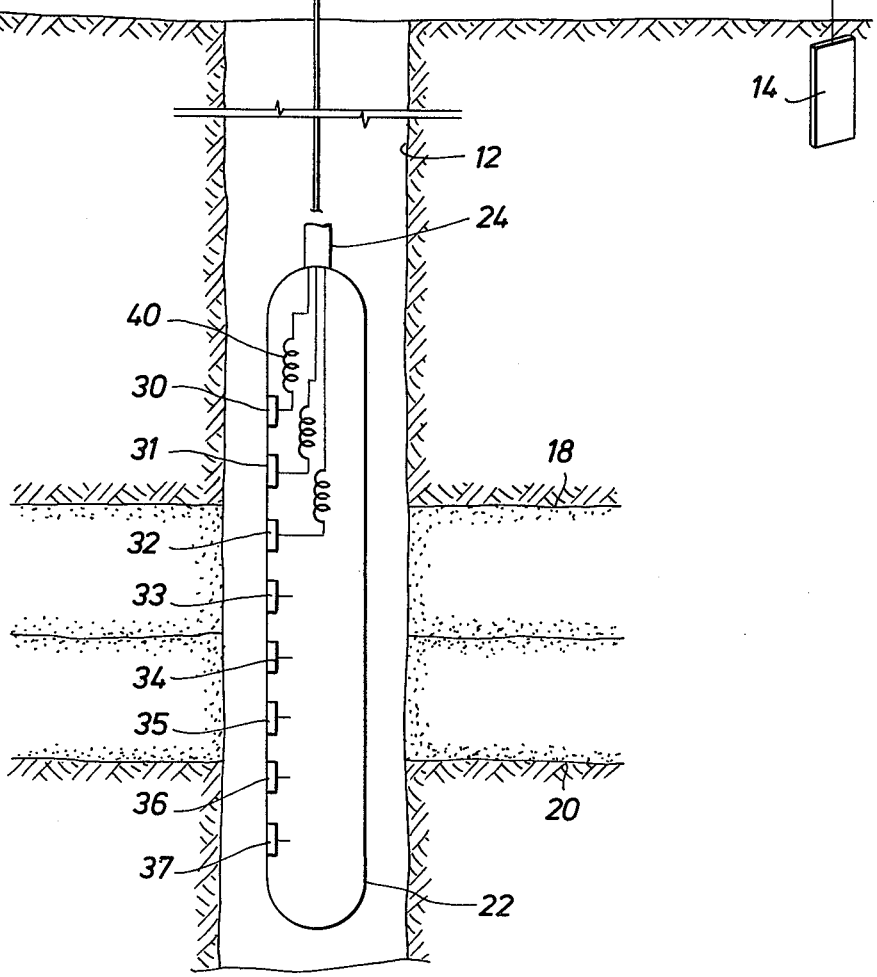

Attention is first directed to FIG. 1 of the drawings. There, the improved SP processing apparatus of this disclosure is generally indicated by the numeral 10. The numeral 10 identified the entire system including the downhole sonde and the surface located equipment terminating in a recorder which forms a recorded signal of interest. The numeral 12 identifies a well bore which is of any suitable depth. It is shown open hole so that the tool can electrically contact the various formations and measure the spontaneous potential SP of the several formations. At the surface, a reference electrode is electrically grounded and is identified by the numeral 14. It connects to a conductor 16. It often has the form of a metal plate conveniently placed in the mud pits to serve as the reference electrode. Various potentials are compared with the potential at the electrode 14.

The well bore 12 penetrates a first formation 18. A second formation is shown at 20. These two formations may be formations of interest and they may well be located 10,000 feet or deeper in the well. Moreover, the well bore 12 penetrates the two formations and the side walls of the well bore are exposed to enable the SP electrodes to come into electrical contact via the bore hole fluid with the formations 18 and 20.

A sonde 22 is lowered to the bottom of the well on a cable 24. The cable 24 is a typical insulated or armoured logging cable having multiple insulated conductors and an outer armor sheath. With appropriate filters, many SP measurement signals can be multiplexed even on one cable conductor. The SP measurement is made at DC potentials or at very low AC potential (5 hertz). Thus, high speed telemetry or 400 hertz power signals may be AC coupled and decoupled to a cable conductor used for SP measurements.

Cable 24 supports the sonde 22 as it is suspended in the well. Typically, the sonde is first lowered to the bottom of the well and then is pulled upwardly for a logging run. The sonde is used by pulling the sonde upwardly whereby data is recorded from the bottom of the well to the top. However, downward logging is also possible. The cable 24 passes over a pulley 26 and is spooled on a drum (not shown for sake of clarity). The cable 24 contains a number of conductors which may be single wires. These conductors are deployed at 28 and are all input to equipment which will be described.

The numeral 30 identifies a first SP electrode. It is the topmost electrode. It is supported on the sonde 22 so that it electrically contacts the well bore fluid. As necessary, an isolation choke filter may be incorporated with the electrode 30; the filter is identified by the numeral 40. It couples the signals to the cable and provides high frequency isolation.

The number 30 identifies the topmost SP electrode. A second electrode is incorporated at 31. Another electrode is identified at 32. The remaining electrodes are numbered 32–37 inclusive. They are identical except vertical location and are electrically insulated from the body of the sonde 22.

The vertical spacing of the electrodes is of some interest. The vertical spacing should be a known distance. Ideally, it should be uniform from electrode to electrode. This is a convenience in the time or depth shifting which will be described. Irregular spacing can be accommodated through the use of irregular time or depth shifting. However, a uniform time or depth shift is implemented if the electrodes are themselves evenly spaced. For ease of description, assume that the electrodes are all spaced one foot apart from electrode to electrode and are located on the same side of the sonde 22, or alternatively, fully encircle the sonde.

In the illustrated embodiment, eight electrodes are included, and they provide eight SP measurement signals to the surface. The eight signals are of a similar nature, namely each one being a few millivolts in magnitude DC or low frequency AC signal in contrast with the ground potential at the electrode 14. The several signals are thus supplied to the surface to an analog multiplexer 42. The multiplexer 42 time multiplexes the eight analog signals which are furnished to it. It is done under timed control of a clock 44. The clock 44 is depth synchronized via an electrical connection to the sheave wheel 26 as indicated by the dotted line 71. The clock 44 thus generates an output pulse for each unit of depth movement of the downhole sonde 22. The multiplexer 42 outputs the several input signals in timed sequence to a volt meter 48. The volt meter 48 measures the potential difference between the eight SP electrodes on the sonde 22 and the ground or reference electrode 14. The timed sequence of output analog potential differences is then provided to an analog to digital converter 50. The converter 50 outputs a timed sequence of digital words. The digitized values are then input to a digital multiplexer 52. The multiplexer 52 is driven in time or depth sequence by the clock 44. The multiplexers 42 and 52 operate at the same speed and are synchronized with one another via clock 44. In the preferred embodiment, eight electrodes are included. They provide eight digital words output from the multiplexer 52. The output serially occurring from the multiplexer 52 is time interlaced. Thus, the first word output is for the electrode 30. The second word output from the multiplexer 52 is for the electrode 31, and so on. Then, the sequence begins anew for the electrode 30.

The several output words are then multiplexed by the multiplexer 52 to a set of delay registers 54–56. It should be recalled that the apparatus functions quite well with digital components. Thus, the signal from the electrode 37 is output through the delay register 54. A signal from the electrode 30 is output through the delay register 56. A similar delay register is included for each of the electrodes. The first delay register provides no delay. The delay register 56 provides a delay which is 7T where T is the period of the depth synchronized clock 44. The others provide delays of 1T, 2T, 3T, etc.

The eight delay registers shown in FIG. 1 are then input to a digital adder 58. The adder 58 thus receives simultaneous depth corrected input of the eight signals and they are added. The output of the adder 58 is then connected to a digital to analog converter 60 which forms an analog output signal. That, in turn, is input to a recorder 62. Alternatively, if a digital recorder 62 is used, the digital output of adder 58 can be supplied directly to the recorder 62 via line 72. In addition, the position of the sonde is determined by the operation of the cable 24 passing over the sheave wheel 26, and the depth of the tool is another variable which is input to the recorder. This is accomplished by the connection 64 shown in FIG. 1.

The sheave wheel 26 is rotated at a rate dependent on the rate at which the sonde is moved. This may change either by altering the speed of the cable reeling apparatus, or by variations in drag as the sonde moves along the well bore. In either case, the cable speed (and hence the sonde speed ignoring cable elongation) variation compresses or spreads the vertical spacing between data points. The sampling rate (under clock control) is then made (by integrating the sonde speed) proportional to position, yielding uniform sample spacing vertically in the well bore which spacing does not vary with changes in velocity. Otherwise, a change in sonde speed would change vertical sample spacing. This is implemented by making the clock 44 operate dependent on cable position sensed by the sheave wheel 26, and a sheave wheel signal is transferred from the sheave wheel 26 via line 71 to the clock 44 to snychronize the clock operation with sonde position in the well bore.

Cable stretching can be determined by measuring cable tension with a tension measuring sensor shown at 66. The tension sensor 66 forms a signal related to cable tension which, through the use of known relationships, can be converted into instantaneous measurements of cable length corrections. The signal from the cable tension sensor is preferably input (via an electrical connection not shown in FIG. 1) to a central processor unit (CPU) 68 having suitable memory for correcting the measured depth of the sonde. For instance, the sonde may start a logging run 16,000 feet deep and is pulled up at a rate of 60 feet per minute. The sonde position is known at any instant from sheave wheel 16 measurements and CPU 68 corrections thereto for cable stretch.

This assumes a cable which does not vary in length. An elongation of only 0.20% at this depth will create a variation in location of 32 feet. While actual variations in position will not usually be so great, this clearly demonstrates the value of the cable length correction to accurately relate SP measurements to depth in the bore hole.

The CPU 68 is optionally switched by a switch 70 into the system after the several signals are time or depth shifted. The several SP signals, having the form of interlaced digital words, are input to the CPU 68 to be examined prior to addition. They are examined to verify data validity prior to summing. Consider, as an example, that eight SP signals from eight electrodes are obtained. After time or depth shifting at the registers, the CPU 68 is input with eight digital words which can be compared and tested for validity. Assume that six of the measurements are in the range of 100–108 millivolts. Assume that one value is 138 millivolts while another is 82 millivolts. These measurements are probably erroneous as evidenced by most statistical analysis methods. Such values may be detected and discarded in the event selected data points exceed three standard deviations, as an example. Some standard for validity testing is implemented by stored computer program instructions in memory for the CPU 68.

The testing (and discarding of data) is implemented before the data is input to the adder 58. Even if data words are periodically rejected and removed from the data flow, the additive composite formed by the system is quite accurate, even notably enhanced by the imposition of the CPU 68 for selectively screening and rejecting data.

FIG. 1 discloses several components at the well head which can be located in the sonde 22 as desired.

The eight electrodes form eight signals which must be multiplexed. Multiplexing prior to cable transmission reduces the requirement for conductors in the cable. It is advantageous for this reason to locate the multiplexer 42 in the sonde 22. Ideally, the voltmeter 48 and analog to digital converter 50 are also located in the sonde 22 so that the total number of used conductors within the cable are reduced. In fact, this relocation to the sonde will reduce the signals in the cable 24 to the ground electrode signals and the bit stream of digitized SP values.

Figure 2:
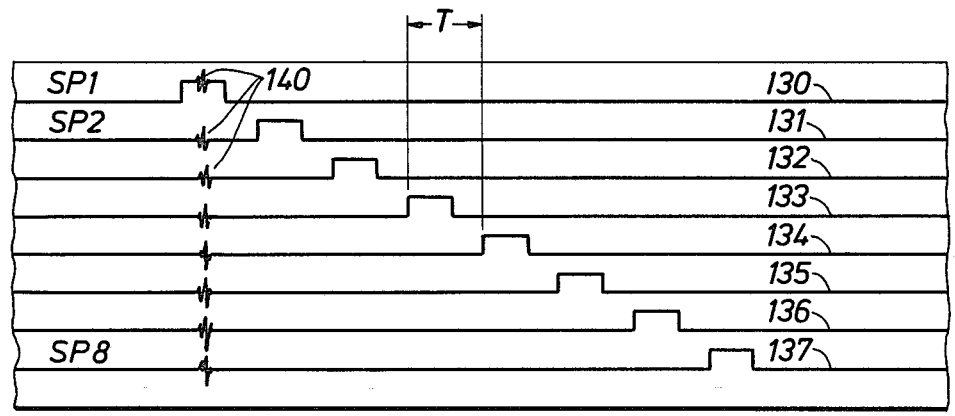
FIG. 2 is a time base graph of several SP signals obtained as an intermediate step in the practice of the present method showing a noise burst on the several SP signal traces.

To understand better how this apparatus operates, attention is directed to FIG. 2 of the drawings. There, eight SP signals are recorded on a common chart. Depth is the common base line for the eight traces. Assume, for purposes of description, that the eight traces are recorded on eight parallel tracks and have a common scale factor. Assume the pulse of interest shown in the eight traces is eighty millivolts. Assume further that the topmost trace 130 is the trace obtained from the top electrode 30. Assume further that it is obscured by a large spike of noise 140. The spike of noise overlays the data pulse of interest shown in FIG. 2. If this were the only signal provided, log interpretation would be somewhat obscure. The data of interest would be obscured by the spike of noise. The noise spike is further assumed to be common to all of the electrodes. In fact, noise coincidence is shown in FIG. 2. Typically, the noise will be identical in amplitude because the several electrodes are, considering the scale of most systems, quite near to one another sufficiently that they all receive the same noise spike and output the noise is equal amplitude. This is shown in the eight traces in FIG. 2.

Figure 3:
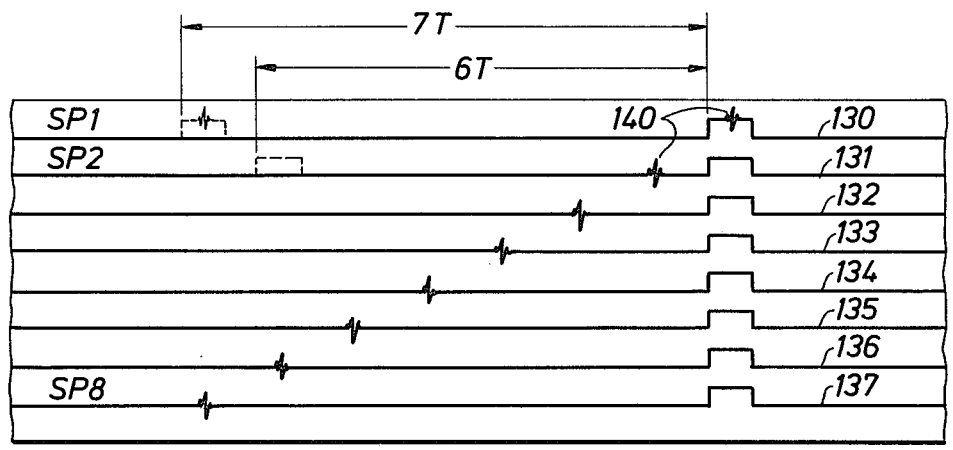
FIG. 3 is a view similar to FIG. 2 showing the various SP logs time shifted in comparison with the unshifted representation of FIG. 2.

FIG. 2 shows one typical data peak of interest in the eight traces. It will be observed that it is depth shifted. The depth shift, from trace to trace, is identified by the symbol T. Assume, for easy description, that the electrodes are one foot apart on the sonde and that the sonde is being retrieved from the well bore at a rate of one foot per second. The spacing T will thus be one foot. As between the traces 130 and 131, they do not originally coincide but shifting of the traces by one foot brings them into coincident arrangement. In FIG. 3, the lower trace 137 is not shifted and serves as the reference. The trace 130 is shifted 7T while the trace 131 is shifted by an interval equal to 6T. In this instance, it would be multiples of one foot. This brings the peak of interest into time coincidence for both traces. Moreover, the noise is now shifted to a different location comparing traces 130 and 131. The noise burst on the trace 130 does not coincide with the noise burst on the trace 131. All of the signals in FIG. 3 are depth shifted. Thus, there are eight traces, and picking one as the reference, this requires the shifting of the other seven. One of the seven is shifted by an interval equal to 7T or seven feet in the example. The trace 130 is, like all the others, brought into depth coincidence.

Figure 4:
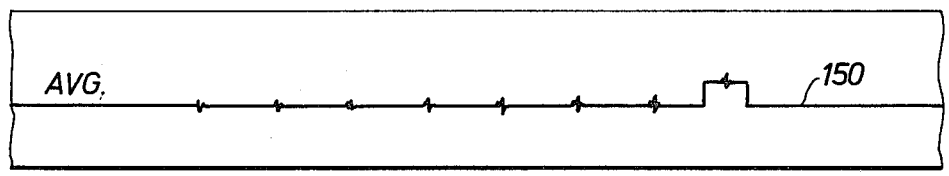
FIG. 4 shows the signal which is obtained by addition of the several signals depicted in FIG. 3.

FIG. 3 thus shows the coherent data depth shifted to that it may be added and will therefore be reinforced. Just as importantly, the signals 140 representing a noise burst have been depth shifted to new locations and will not be reinforced when the signals are added. Keeping in mind that noise is a random occurrence, it is just as likely to be negative going noise spikes as well as positive going spikes. The addition of the random noise on the baseline thus has a tendancy to null the noise spikes and reduce their relative amplitude. Therefore, FIG. 4 shows a composite waveform 150 where the resulting composite signal of interest is relatively larger than the resulting noise. It is particularly larger in contrast with the noise which has been reduced. The common noise spike which was shown in the traces above FIG. 4 has been reduced. While it may still be on the baseline, it is spread materially, and is therefore less of a problem in interpretation. In actuality, noise tends to cancel because of the random or incoherent nature of the noise. As previously mentioned, statistical comparison of the time or depth shifted data would allow rejection of data values which are determined erroneous thus resulting in additional improvement in the composite signal.

The method of the present invention thus relates the vertical spacing of the SP electrodes on the sonde with the rate at which the sonde is retrieved from the well bore. In the example given, a one foot spacing with a rate of retrieval of one foot per second requires a time shift of one second from trace to trace. Obviously, other scale factors can be applied to the equipment. The scale factors should take into account the physical requirements for the size of the sonde and the rate at which the sonde can be readily retrieved from the well while maintaining the electrodes in electrical contact with the well bore. The rate at which data is converted also poses a limitation on the rate at which data can be converted and time shifted.

Analog equipment can be used, but analog delay lines are somewhat more expensive and difficult to operate and are susceptible to phase shifting. A digital delay line is much handier to work with and is not exposed to the difficulties of analog delay lines. Otherwise, an analog additive system will operate quite nicely.

Certain scale factors are also suggested in the number of electrodes. For instance, signal quality improvement in contrast with noise is typically a square law function so that the inclusion of about eight electrodes provides notable improvement. It is not practical to increase to perhaps sixteen or twenty-four electrodes. Further, the data conversion rate for the equipment should be observed. Multiplexers and analog to digital converters are readily available which operate at quite rapid rates, and therefore enable the preparation of data at a rate handling eight data trains. If the spacing is irregular between electrodes, the depth shifts must be irregular in like fashion. As an example, if two electrodes are one foot apart and another is three feet further, the shifts will vary by a factor of three.

The rejection of obviously noisy data words by a CPU executed program will materially enhance the SP signal. The improvement will reduce output SP log perterbations, yielding an SP log which is easier to read.

While the foregoing is directed to the preferred embodiment, the scope is determined by the claims which follow.

I claim:

1. Detection apparatus to be moved through a fluid filled well bore for testing the well bore as the well bore passes through a plurality of formations in the earth for spontaneous potential resulting from electrochemical potential differences in the formations relative to a reference electrode near the earth's surface, the apparatus comprising:
   (a) multiple redundant spontaneous potential measurement electrodes aligned at known longitudinally spaced distances along a sonde and being adapted to traverse a well bore and being in electrical contact with the borehole fluid, each of said electrodes measuring a potential difference relative to the reference electrode of the spontaneous potential of the earth's formations along the well bore and generating an output signal representative thereof;
   (b) signal processing means connected to said multiple spontaneous potential electrodes for receiving said output signals therefrom and for shifting signals therefrom to an alignment on a base such that a signal from a specific formation from a single spontaneous potential electrode is aligned with a signal from another spontaneous potential electrode for the same formation; and
   (c) summing means provided with said shifted and aligned signals of said signal processing means for adding said shifted and aligned signals in a manner that reinforces signals from the specific formation from multiple spontaneous potential electrodes and substantially tends to cancel randomly occurring noise on individual ones of said output signals.

2. The apparatus of claim 1 wherein said multiple spontaneous potential electrodes are uniformly longitudinally spaced.

3. The apparatus of claim 1 wherein said sonde supports filter means for interconnecting said multiple spontaneous potential electrodes with said signal processing means along a cable adapted to extend from the surface along a well bore to said sonde supported therein.

4. The apparatus of claim 1 including a multiplexer means provided with a plurality of said output signals from said multiple spontaneous potential electrodes, analog to digital converter means connected to the output of said multiplexer means for converting multiplexed analog input signals thereto into a series of digital words representative of the analog amplitude values of said multiple spontaneous potential output signals.

5. The apparatus of claim 4 including a second multiplexer means synchronized with the first multiplexer means and having N outputs where N is a whole number integer and N is the number of said multiple spontaneous potential electrodes.

6. The apparatus in claim 5 further including N delay register means connected to said second multiplexer means for receiving the N multiplexed digital signals from said second multiplexer means.

7. The apparatus of claim 6 further including means for controlling said N delay lines such that a digital signal from one of said multiple spontaneous potential electrodes for a specific formation is depth shifted relative to the digital signal from another of said multiple spontaneous potential electrodes for the same specific formation to achieve a depth coincident arrangement of said signals.

8. The apparatus of claim 7 including output means connected from said delay registers to said summing means.

9. The apparatus of claim 8 further including an adder comprising said summing means.

10. The apparatus of claim 9 further including a recorder means for recording the summed digital signals from said summing means, and also including means for recording the depth of the sonde in the well bore.

* * * * *